Nov. 9, 1971     J. FISHER     3,618,426
TURRET AND LOCKING MECHANISM
Filed Oct. 21, 1969                 4 Sheets-Sheet 1

INVENTOR
JOHN FISHER
BY Yount and Tarolli
ATTORNEYS

Nov. 9, 1971     J. FISHER     3,618,426
TURRET AND LOCKING MECHANISM

Filed Oct. 21, 1969     4 Sheets-Sheet 4

INVENTOR
JOHN FISHER
BY Yount and Tarolli
ATTORNEYS

3,618,426
TURRET AND LOCKING MECHANISM
John Fisher, Aurora, Ohio, assignor to The Warner & Swasey Company, Cleveland, Ohio
Filed Oct. 21, 1969, Ser. No. 868,111
Int. Cl. B23b 29/32
U.S. Cl. 74—824
20 Claims

ABSTRACT OF THE DISCLOSURE

A machine tool includes a mechanism for locking an indexible turret in a predetermined position about an axis of rotation with respect to a slide. The mechanism includes first and second coupling members adjacently located and which are moved relatively upon indexing of the turret. A third coupling member is located adjacent the first and second coupling members and is operable to prevent relative movement of the first and second coupling members by simultaneously engaging the first and second coupling members to thereby simultaneously position and lock the turret. Rotation, release and locking of the turret is effected without axial movement of the turret.

---

The present invention relates to a machine tool and more particularly to an improved locking mechanism for locking an indexible turret in a predetermined position about an axis of rotation with respect to a slide.

Known turret indexing and locking mechanisms, such as the one illustrated in the Diener Pat. No. 2,940,341, assigned to the assignee of the present invention, operate to index and lock a turret of a machine tool. In the known turret indexing and locking mechanism, such as the one shown in Pat. No. 2,940,341, the turret and the slide have toothed coupling elements rigidly affixed thereto which engage to lock the turret in its indexed position. In order to index the turret to a new position, the turret must be raised to allow the elements to disengage. This raising movement of the turret may allow dust and chips to be sucked into the mechanism which may effect a malfunctioning of the mechanism. This movement of the turret has been effected by power means in known turret indexing and locking mechanisms. This is due to the fact that to index the turret, the turret must be raised. Since a turret may be a rather weighty object, weighing over one ton, the mechanisms which require raising of the turret prior to indexing thereof do not readily lend themselves to hand indexing of the turret. Turret locking mechanism has been conceived which eliminate the need for turret raising prior to indexing thereof. Such a mechanism is disclosed in copending application Ser. No. 868,112 filed Oct. 21, 1969, assigned to the assignee of the present invention. The design disclosed in that application requires at least one element for accurately positioning the turret and at least one other element for locking the turret in position. These elements move generally transverse to the direction of rotation of the turret to perform their functions.

It is an object of the present invention to provide a new and improved locking and positioning mechanism for the turret of a machine tool which is constructed so that the turret can be indexed without raising or lowering thereof so that dust and chips are prevented from entering the mechanism due to raising and lowering of the turret and so that the turret may be manually indexed and wherein the locking and positioning are accomplished by the same element.

Another object of the present invention is to provide a new and improved locking mechanism for the turret of a machine tool having first and second coupling members in an adjacent relationship, a third coupling member movable to engage with or disengage with the first and second coupling members to respectively position and lock or unlock the turret and wherein the third coupling member is movable between its engaged and disengaged positions independently of said movement of the turret.

A further object of the present invention is the provision of a new and improved locking mechanism providing for indexing of the turret of a machine tool relative to a slide having a first toothed coupling member rigidly mounted on the slide of the machine tool, a second toothed coupling member located adjacent the first coupling member and rigidly mounted on the turret for rotation therewith, a third toothed coupling member disposed adjacent the first and second coupling members and movable axially of the turret to simultaneously mesh with the first and second coupling members to prevent relative movement therebetween and effectively lock the turret against rotation relative to the slide and accurately position the turret relative to the slide, and wherein the third coupling member is disengaged from the first and second coupling members without axial movement of the turret.

A still further object of the present invention is to provide a new and improved locking mechanism for the turret of a machine tool, as noted in the next preceding paragraph, wherein the third coupling member may be disengaged manually from the first and second coupling members and the turret may be manually accurately indexed to a predetermined position.

Further objects and advantages of the present invention will be apparent from the following detailed description of a preferred embodiment thereof made with reference to the accompanying drawings forming a part of this specification and in which.

The present invention relates to a locking mechanism providing for accurate positioning of an indexible turret on a machine tool. The mechanism is constructed so that the turret can be released, rotated and locked without raising or lowering thereof. As a result, dust and chips are not sucked into the turret indexing mechanism. The mechanism can be used with a variety of machine tools and is shown herein for illustrative purposes only as applied to a machine tool 10.

Figure 1:
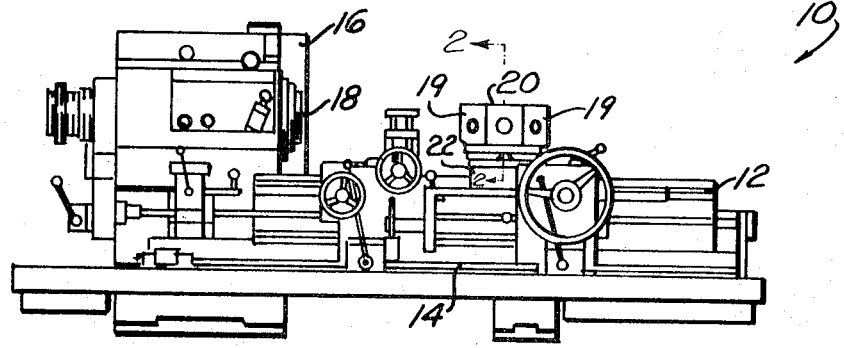
FIG. 1 is a front elevational view of a machine tool having a rotatable turret thereon and embodying the present invention.

The machine tool 10 has a rotatable or indexible turret 20 mounted thereon as shown in FIG. 1. The turret 20 is preferably a hexagonal turret and is mounted upon a slide 22. The slide 22 is mounted on the ways 12 of the machine tool and is guided for movement thereon by the grooves 24 located in the bottom of the slide 22. The machine tool includes a head portion 16 mounted on one end of the bed 14 of the machine 10. The head portion 16 includes a rotatable spindle 18 for engaging and rotating a workpiece therewith. When the workpiece is mounted in the spindle 18, tools mounted on the indexible turret 20 are adapted to engage therewith to effect a cutting of the workpiece. It should be realized that the turret 20 has a plurality of tool faces 19 each of which has tools mounted thereon. The turret 20 is then indexed to provide engagement of the different tools with the workpiece.

Figure 2:
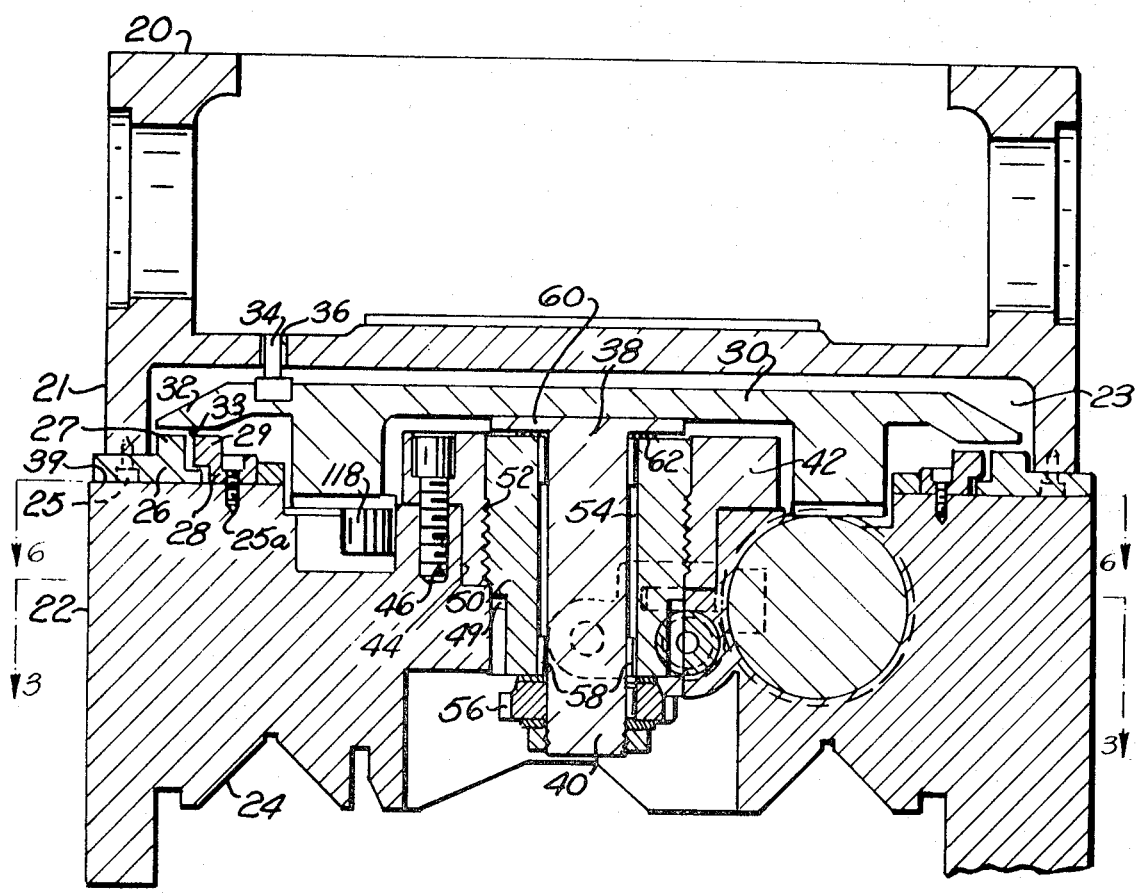
FIG. 2 is a fragmentary sectional view of the machine tool of FIG. 1 taken approximately along line 2—2 of FIG. 1.

The bottom side of the turret 20 includes a cavity or recess 23, more fully illustrated in FIG. 2, formed about the central axis of the turret, which is operable to receive an indexing and locking mechanism for indexing and locking the turret. The cavity 23 is substantially surrounded by an annular skirt 21, which is affixed to the turret 20, and which prevents dust and chips from entering the cavity 23 where the indexing and locking mechanism is disposed.

Located within the cavity 23 is a first coupling member 28 which is rigidly attached to the top 39 of the slide 22 by means of the bolts 25a. The first coupling member 28 is rigidly affixed to the slide 22 so that it is inoperable to rotate with the turret 20. Adjacent to and concentric with the first coupling member 28 is a second coupling member 26 which is affixed to the skirt 21 of the turret 20 by means of the bolts 25. The second coupling member 26 is rigidly affixed to the turret 20 and rotates upon rotation of the turret. The second coupling member 26 and the first coupling member 28 includes teeth 27 and 29, respectively, which face upwardly, as shown in FIG. 2.

The coupling disk 30 includes the third coupling member 32 located in the cavity 23 and is movable axially and rotatably therein. The upper third coupling member 32 and the lower coupling members 26 and 28 comprise a curvic coupling which is operable to effectively lock and unlock the turret with axial movement of third coupling member 32. To this end, the third coupling member 32 has downwardly facing teeth 33 which are located directly above the spaces between the teeth of the coupling members 26 and 28. The teeth 33 are of a sufficient length to engage the teeth spaces of both the coupling members 26 and 28 when the upper coupling member 32 is moved axially downward toward the slide 22. When the downwardly facing teeth 33 of the upper coupling member 32 simultaneously engage with the spaces between the teeth 27 and 29 of the lower coupling members, respectively, rotation of the turret 20 is prevented. Downward movement of the upper coupling member 32 will occur when the turret 20 is accurately indexed to one of its work positions. The teeth 27, 29 and 33 of the respective coupling members 26, 28, and 32 will be aligned and the upper coupling member 32 will be allowed to mesh upon downward movement thereof with the teeth of the lower ring gears 26 and 28. Meshing of the upper curvic coupling member 32 with the lower curvic coupling members 26 and 28 will lock and effectively prevent relative rotation of the turret 20 as the non-rotatable lower curvic coupling member 28 is fixed to the slide 22.

It should be realized that the relative angular position of the turret 20 at the end of the indexing movement need not be precise but need only be within a predetermined angular dimension or tolerance since the teeth 27 on the coupling 26 affixed to the turret will be guided into accurate alignment with the fixed coupling member 28 by the meshing of the teeth 33 with the teeth 27 and 29 of the couplings 26 and 28. In this manner, the precise mating engagement and accurate relative disposition of the coupling members and the turret will be maintained when the teeth 33 mesh with the coupling members 26 and 28. Thus, if for some reason the turret is not precisely indexed the meshing of the teeth 33 with the teeth 27 and 29 will effect further minimal rotation of the turret 20 to effect precise indexing thereof.

Axial movement of the upper coupling disk 30 is effected by a plug member 38 which is rigidly attached to the coupling disk 30. The plug member 38 has an axially extending portion 40 which extends into a recess 44 in the slide 22. The recess 44 is of a step configuration and is co-axially located along the axis of rotation of the turret 20. Disposed within the recess 44 and around the extending portion 40 of the plug member 38 is a sleeve 50 having an axial bore 54 extending the entire length thereof. The sleeve 50 has external threads 52 machined thereon which are threaded into an internally threaded nut 42 which is fastened to the upper face portion of slide 22 by machine screws 46. The nut member 42 extends into the stepped recess 44 and the screws 46 prevent rotation of the nut member 42 therein.

A pair of axially extending needle bearings 58 are located between the axially extending portion 40 of the plug 38 and the threaded sleeve 50. Additional needle bearings 62 of the flat radial type are located between radial shoulder 60 of the plug member 38 and the upper end of the sleeve 50. The needle bearings 58 and 62 enable the upper coupling disk 30 and the plug member 38 which is rigidly attached thereto to be frictionlessly journaled upon and within the externally threaded sleeve member 50.

Sleeve 50 at its lower end thereof has a pinion or gear section 56 attached thereto. Rotation of the sleeve 50 by the section 56 effects axial movement of the sleeve 50 upwardly or downwardly relative to the nut member 42 depending upon the direction of the rotation of the gear section 56. Axial movement of the sleeve 50 effects axial movement of the upper coupling disk 30 and causes the coupling teeth 33 to engage or disengage with the coupling teeth 27 and 29 of the lower coupling members 26 and 28.

Figure 3:
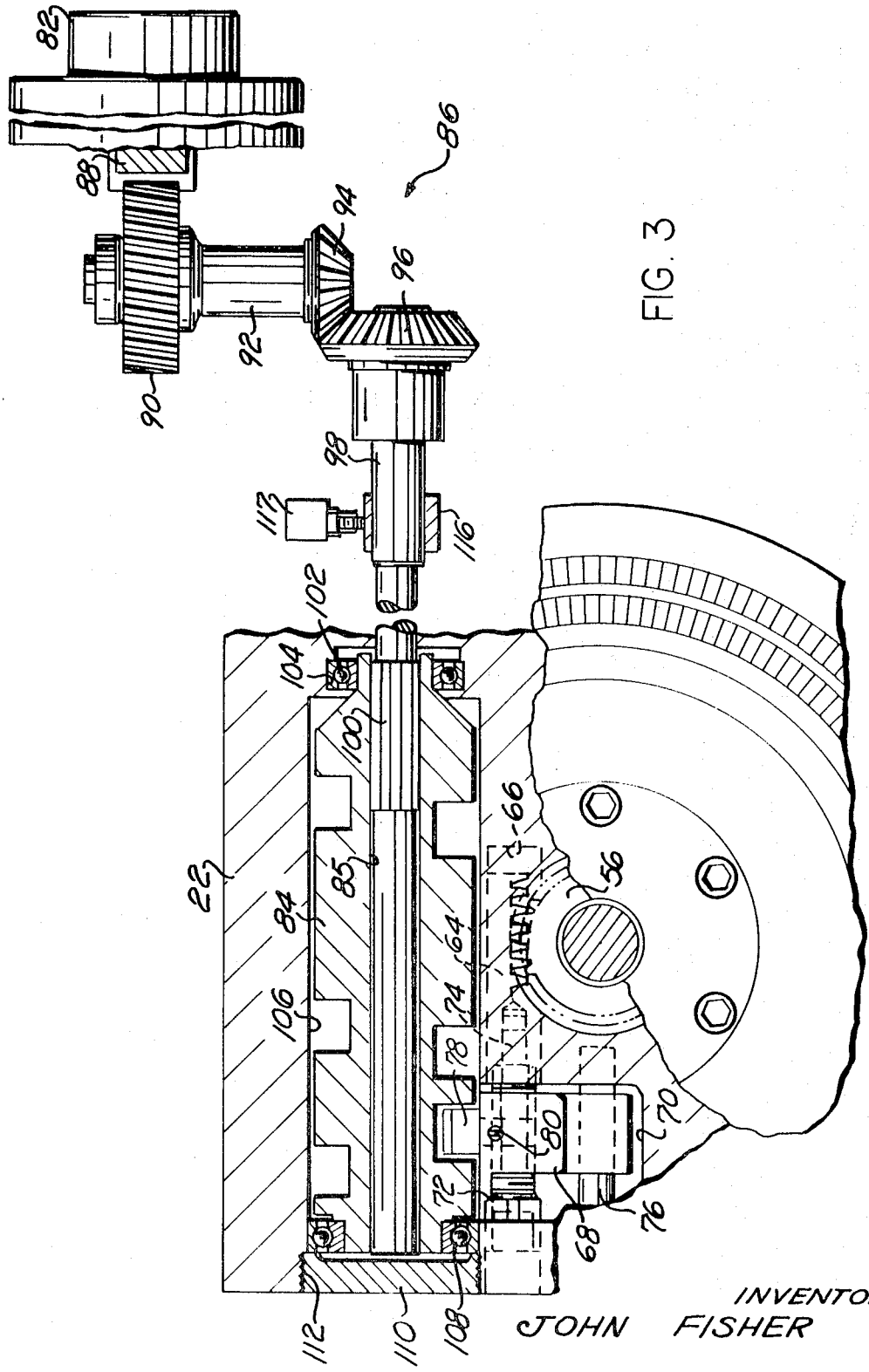
FIG. 3 is a fragmentary sectional view taken along lines 3—3 of FIG. 2 and showing the indexing control cam drive.

The gear section 56 is in meshing engagement with a tooth rack bar 64, more fully illustrated in FIG. 3. The tooth rack bar 64 is slidably located within a bore 66 disposed in the slide 22 and is securely affixed to a carrier member 68 located in the recess 70 formed in the slide 22. The carrier member 68 is attached to the rack bar 64 by a threaded sleeve bolt 72 and a screw 74. The externally threaded sleeve bolt 72 extends through and is threadably affixed to the carrier member 68. The screw 74 is then threaded through the sleeve bolt 72 into the rack bar 64 so as to draw the sleeve bolt and rack bar into axial abutment with each other and thereby form a rigid assembly of the rack bar 64, the sleeve bolts 72 and the screw 74 with the carrier member 68.

The carrier member 68 has a guide pin 76 which extends through an opening in the carrier member 68 parallel to the sleeve bolt 72 and the rack bar 64. The guide pin 76 slidably supports the carrier member 68 and allows movement of the carrier member 68 in a direction which is parallel to the direction of movement of the rack bar 64. The carrier member 68 has a locking cam follower 78 threaded into the carrier member 68 in a direction perpendicular to the longitudinal axis of the rack bar 64. The locking cam follower 78 has a set screw 80 threaded therethrough and into the carrier member 68 to rigidly fasten the cam follower to the carrier member. The cam follower engages with a cam 84 and movement of the cam effects movement of the rack bar 64.

It should be realized that movement of the cam follower 78 by the cam 84 effects movement of the rack bar 64 and rotation of the gear section 56 attached to the sleeve 50. Rotation of the sleeve 50 as hereinabove described, effects axial movement of the sleeve 50 in the stepped recess 44. Movement of the sleeve 50 effects axial movement of the coupling disk 30 which in turn effects a locking or unlocking of the turret mechanism by effecting an engaging or disengaging movement of the upper coupling member 32 with the lower inner and outer coupling members 26 and 28, respectively.

The cam 84 is rotated by means of a reversible electric motor 82 and a reduction gear mechanism 86 communicating with the motor 82 and the control cam 84. The motor 82 includes a drive shaft 88 which rotates a worm gear, not shown. The worm gear engages with and effects rotation of a worm wheel 90 which is rigidly affixed on one end of the shaft 92. The other end of the shaft 92 has a bevel gear 94 mounted thereon, which meshes with a similarly beveled gear 96. The bevel gear 96 is rigidly affixed to the shaft 98 which has a spline portion 100 on its opposite end which is disposed internally of the control cam 84. The splined end 100 suitably engages reciprocal splines located in a passageway 85 disposed concentrically along the longitudinal axis of the control cam 84.

Suitable ball bearings 102 disposed in recesses 104 formed in the slide 22 suitably journal the shaft 98 into the control cam 84. The opposite end of the control cam 84 is likewise suitably journaled within the cylindrical bore 106 in which the cam is located by ball bearings 108 which serve to rotatably mount the other end of the cam 84. The cylindrical bore 106 in which the cam is mounted is suitably closed at the opposite end by closure member 110 which is threaded into the outer end 112 of the cylindrical bore 106.

Figure 4:
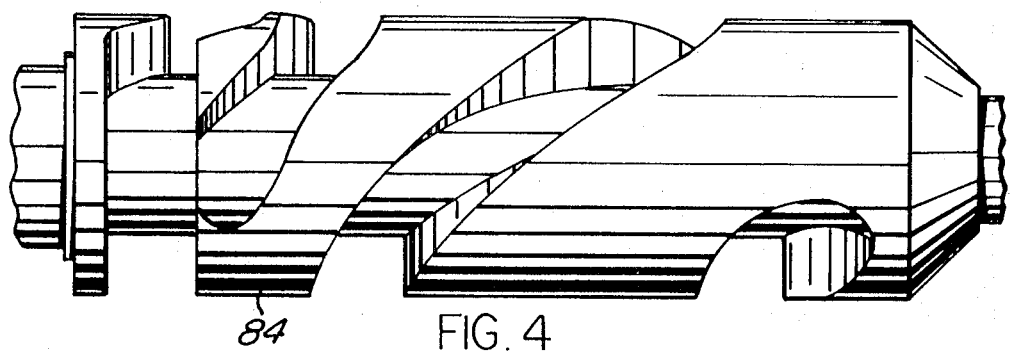
FIG. 4 is an enlarged view of the indexing control cam.
Figure 5:
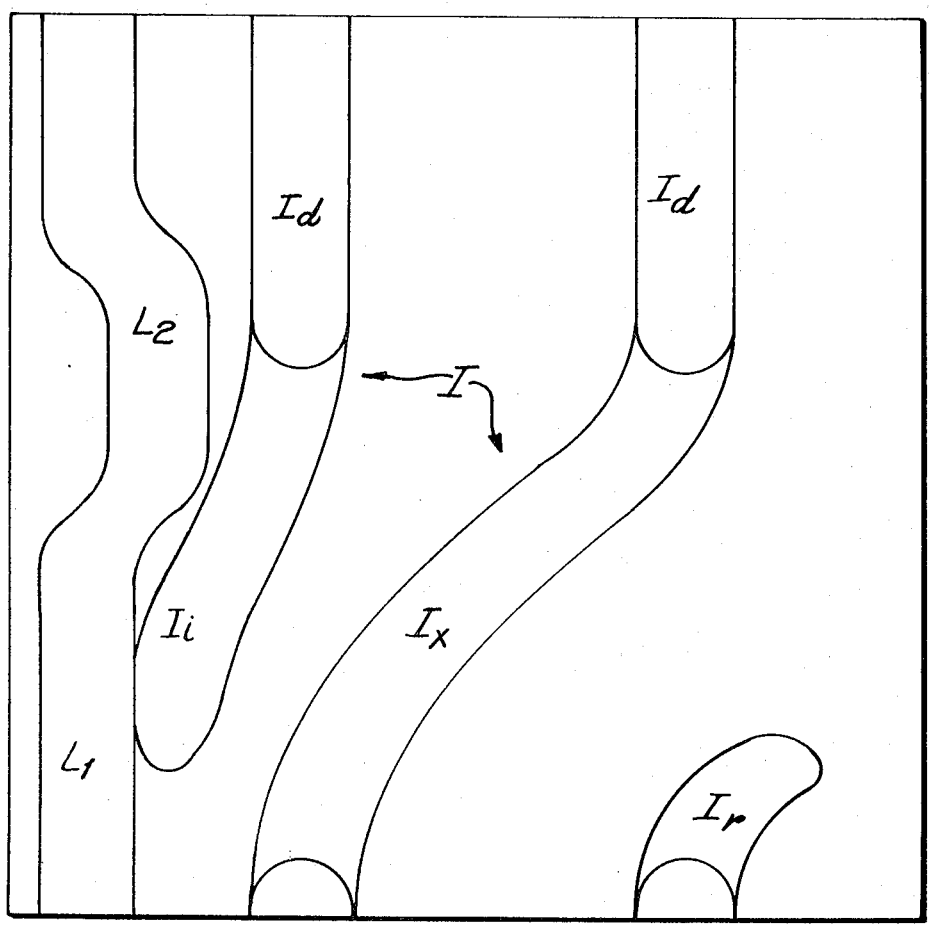
FIG. 5 is a layout of the indexing control cam showing how the cam surfaces are generated in two dimensions.

The cam 84 comprises a pair of separate cam surfaces L and I in a side-by-side relationship, as illustrated in FIGS. 4 and 5. Cam surface or groove L is of a closed circuit type having a circular dwell portion $L_1$ for maintaining the turret 20 in unlocked and unclamped relationship to slide 22 by disengagement of the coupling members 26 and 28 with the upper coupling member 32. A clamping or locking portion $L_2$ is interposed in the path of the circular groove $L_1$ and the path of rotation of cam 84 moves or forces the locking cam follower 78 axially to the right for locking or clamping of the turret 20 to the slide 2 via the rack 64 and the gear 56. The movement of the cam follower 78 to the left and into the dwell portion $L_1$ effects rotation of the rack 64 and gear 56 in a counterclockwise direction as viewed in FIG. 3. Counterclockwise rotation of the gear 56 effects axial movement of the sleeve 50 in an upwardly direction which effects disengagement of the upper coupling 32 with the lower coupling members 26 and 28 and allows the turret 20 to be rotated.

Figure 6:
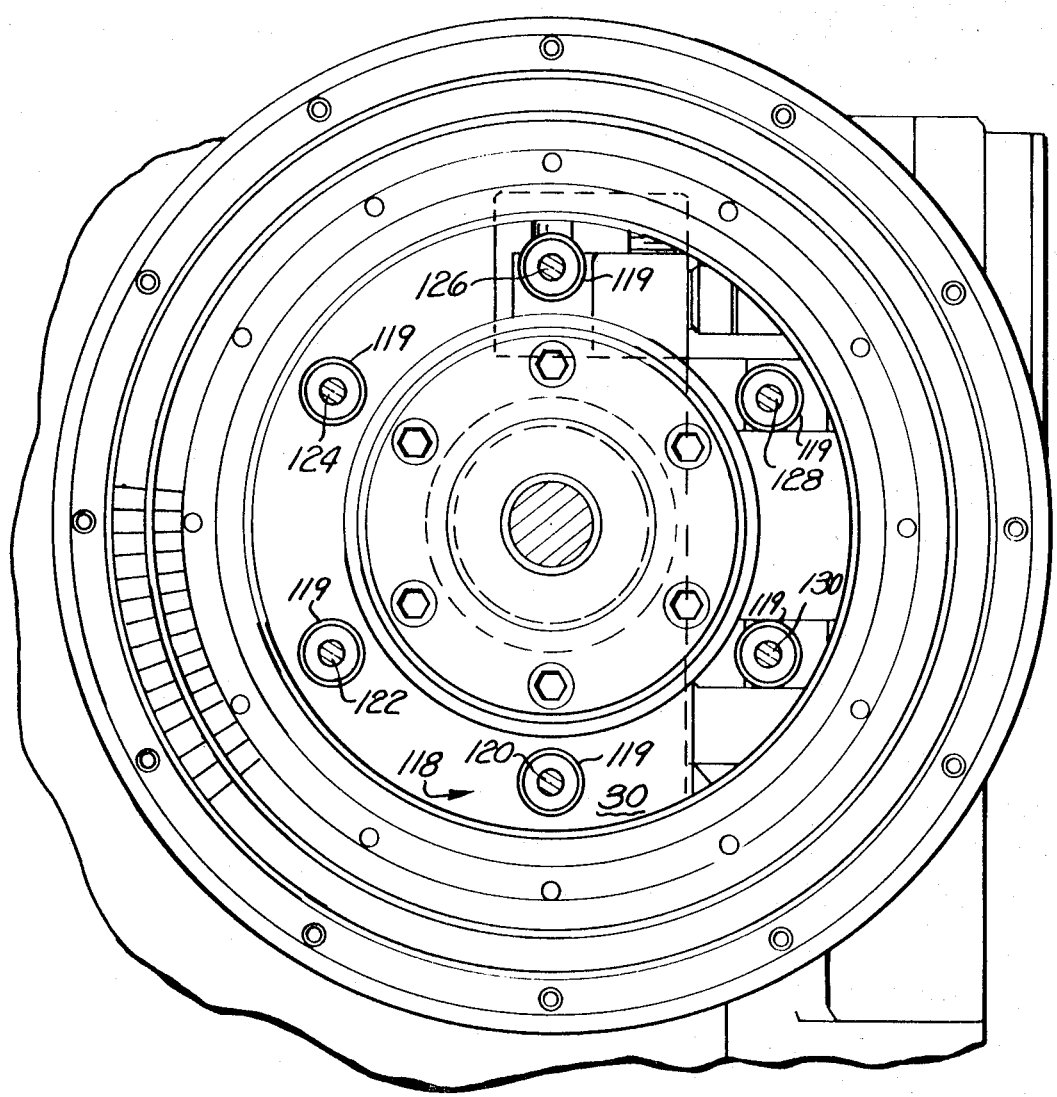
FIG. 6 is a top plan view of the automatic indexing turret with the turret head removed, as viewed approximately along lines 6—6 of FIG. 2.

Cam 84 is also provided with an indexing cam surface or groove of an open circuit type comprising a run-in portion $I_i$, a dwell portion $I_d$, and indexing portion $I_x$, another dwell portion $I_d$ and a run-out portion $I_r$. The indexing cam surface or groove I engages with a plurality of cam followers 118 provided on the under surface of the upper coupling disk 30 as shown in FIG. 6. The cam followers 118 consist of six equal-angularly spaced indexing cam followers 120, 122, 124, 126, 128 and 130. The cam followers 118 are each provided with a roller portion 119 which is received in the indexing groove I of the cam 84, with the cam followers 118 being secured to the coupling disk 30 by means of threaded shanks integral therewith. It should be apparent that rotation of the cam 84 will effect a raising of the upper coupling disk 30 by movement of the cam follower 78 by the cam groove L and rotation of the upper coupling disk 30 by movement of the cam followers 118 through the cam groove I.

When it is desired to rotate the hexagonal turret 20 the electric motor 82 through the reduction gear mechanism 86 effects rotation of the cam 84. The control cam 84 then moves the cam follower 78, carrier member 68, and rack bar 64. Rack bar 64 effects rotation of the gear 56 which is rigidly affixed to the sleeve 50. The rotation of the sleeve 50 in a counterclockwise direction causes it to be screwed upwardly in the internal threaded nut 42. The rotation of the sleeve 50 in an upward direction carries with it the plug 38 and the upper coupling disk 30. The upper coupling disk 30 moves in a vertical direction toward the bottom of the turret 20 and into the recess 23 located therein. Upward movement of the coupling disk also effects sliding of the pin 34 within the opening 36 in the bottom of the turret. The upward movement of the disk 30 effects an uncoupling of the upper coupling member 32 with the lower coupling members 26 and 28, respectively. This allows the outer coupling member 26 to rotate relative to the fixed inner coupling member 28. Moreover, since the pin 34 is within the opening 36 coupling disk 30 is in a driving relationship with the turret and rotation of the disk 30 will effect rotation of the turret 20.

After the coupling disk 30 has been raised by rotation of the gear 56 and sleeve 50, the indexing portion $I_x$ of the cam operates to rotate the cam followers 118, which are fixed upon the lower portion of the disk 30. Since the pin 34 which is rigidly fixed to the upper coupling disk 30 engages in opening 36 in the turret 20, the turret 20 and the outer coupling member 26 rotate when the upper coupling disk 30 rotates. Hence the upper coupling member 32 and the outer coupling member 26 are maintained in the same relative position as they are rotated relative to the fixed inner coupling member 28.

After the upper coupling disk 30 has indexed the turret 20 to its desired location, it is desirable to lock the turret at that position. This is accomplished by further rotation of the control cam 84. This further rotation moves the cam follower 78 to a locked position. When the cam follower 78 is moved to its locked position by the portion $L_2$ of the cam 84, the carrier member and rack bar 64 are also moved. Rack bar 64 in turn rotates gear 56 in a reversed direction so as to cause sleeve 50 to be screwed downwardly in the internally threaded nut 42. The downward movement of the sleeve 50 is imparted to the plug 38 and the upper coupling disk 30 attached thereto. As the upper coupling disk 30 moves downwardly, the upper coupling member 32 is forced into engagement with the outer coupling member 26 and the inner coupling member 28. The turret is then accurately positioned and securely locked relative to the slide since the outer coupling member 26 which is rigidly fixed to the turret 20 and the inner coupling member 28 which is rigidly fixed to the slide member 22 are meshed with the upper coupling member 32 thereby locking all three gears into a rigid coupling. It should be noted that when the turret is locked, the upper coupling disk 30 exerts a downward or clamping force upon the outer coupling member 26 which is affixed to the turret. The downward force exerted by the disk 30 prevents axial movement of the turret. Thus, any axial motion that might be imparted to the turret 20, due to the interaction of the tools in the turret and the rotating workpiece, will be opposed by the force exerted by the coupling disk 30 and axial movement of the turret will be prevented.

It should be realized that the axial movement of the coupling disk 30 does not affect axial movement of the turret 20. The axial movement of the coupling disk 30 rather occurs within the recess 23 disposed beneath the turret. Therefore, the turret is indexed by planar movement and dust and chips are prevented from entering the indexing and locking mechanism.

A limit switch 117 may be provided adjacent to a cam 114 having a cam lobe 116 thereon which is attached to a shaft 98 in the reduction gear mechanism 86. Switch 117 may ride on a cam 114 and be used to electrically brake the motor 82 when the turret is indexed from one working position to the next successive working position. It should be apparent that every complete rotation of the cam member 84 will effect rotation of the turret member 20 from one work station to another. Thus, during each single rotation of the cam 84, the shaft 98 will rotate and the lobe 116 of the cam 114 will energize the switch 117 to brake the motor 82. Therefore, when it is desired to index the turret 20, the operator of the machine tool will energize the motor 82. When the motor 82 indexes the turret to its next work station, the motor 82 will be automatically stopped by the switch 117 as the cam lobe 116 activates the switch and the turret will be locked into position. Moreover, suitable override controls may be provided if it is desired to index the turret to a work position other than the next successive work position.

While power means have been illustrated and described to index and lock the turret 20, it should be realized that the turret could easily be indexed by hand. To this end, means could be provided to manually effect a raising of the upper coupling member 32. This is easily accomplished due to the fact that only the upper coupling member 32 need be raised to unlock the turret. This presents a distinct advantage over the prior art in that unlocking of the turret previously required raising the turret. Since the turret may weigh many hundreds of pounds, this could not be done by hand. Also, due to the fact that the upper coupling member 32 is relatively light, when compared to the turret 20, the time for indexing and locking the turret may be substantially reduced regardless of whether the lifting and locking is accomplished by power means or by hand. The lighter coupling member 32 may be raised more rapidly than the heavy turret. Once lifting of coupling member 32 is accomplished, the turret 20 may be rotated either by the power means disclosed herein or by hand. The fact that indexing of the turret does not require vertical movement of the turret allows the turret to be indexed by relatively small forces. This is a great improvement over the prior art in that indexing of large turrets regardless of their weight may now be accomplished by hand in a relatively short time span.

It should be apparent that the annular skirt 21 prevents dust and chips from entering the recess 23 where the indexing and locking mechanism is located. The annular skirt 21 and the outer coupling member 26 which is contiguous therewith form a barrier which is adjacent to the upper surface 39 of the slide 22. The skirt 21 and the coupling member 26 are movable only in a single horizontal plane parallel to the upper surface 29 of the slide 22 and are not movable vertically therefrom. Thus, the adjacent relationship of the skirt 21 and the coupling member 26 to the slide 22 remains constant and dust and chips are prevented from entering the indexing and locking mechanism.

Having described my invention, I claim:

1. A mechanism for positioning and securing an indexible turret against rotation with respect to a slide, said apparatus comprising a first locating and locking element connected to the slide and including a first annular array of teeth, a second locating and locking element connected to the turret and including a second annular array of teeth disposed in a concentric relationship with an axis of rotation of the turret and with said first annular array of teeth, a third annular locating and locking element disposed in a concentric relationship with the axis of rotation of the turret and with said first and second annular arrays of teeth, said third locating and locking element including tooth means for meshing engagement with at least a portion of said first and second annular arrays of teeth to position and secure the turret in a selectable predetermined position with the slide, and means for effecting axial movement between said third annular locating and locking element and at least one of said annular arrays of teeth to move said tooth means into and out of meshing engagement with at least one of said annular arrays of teeth.

2. A mechanism as defined in claim 1 wherein said first element is rigidity affixed to the slide, said second element is rigidly affixed to the turret and said third element is axially movable relative to the turret to engage and disengage said first and second elements.

3. A mechanism as defined in claim 1 wherein said third element is drivingly coupled to the turret by a pin carried by one of said third element or the turret, said pin being slidably engaged in an opening in the other of said third element or the turret.

4. A mechanism as defined in claim 3 further including means for rotating said third element and wherein rotation of said third element is transmitted through said pin from said third element to the turret to thereby effect rotation thereof.

5. A mechanism as defined in claim 4 wherein said means for rotating said third element includes a control cam, a plurality of cam followers affixed to said third element, said cam followers engaging said control cam and effecting movement of said third element in response to the rotation of said cam, and a drive means to controllably rotate said control cam.

6. A mechanism as set forth in claim 1 wherein said tooth means includes at least one tooth which meshingly engages teeth in both said first and second annular arrays of teeth to maintain the turret in the selected predetermined position with respect to the slide.

7. A mechanism as set forth in claim 1 wherein said means for effecting axial movement includes means for releasing the turret for rotational movement relative to the slide without moving the turret along its axis of rotation relative to the slide by moving said tooth means out of engagement with said first and second annular arrays of teeth.

8. A mechanism for positioning and securing an indexible turret against relative rotation with respect to a slide comprising first, second and third annular toothed locating and locking elements disposed concentric to the axis of rotation of the turret with said first element carried by the upper side of the slide, said second element carried by the bottom side of the turret and said third element carried by the slide, said third element having means for engaging said first and second elements to position and secure said turret in a selectable predetermined position with respect to the slide, and an externally threaded sleeve, said third element having a cylindrical portion extending axially therefrom rotatably contained by said externally threaded sleeve, said sleeve being threadably received in an internally threaded element that is rigidly secured to the slide so that upon rotation of said externally threaded sleeve said third element is axially moved relative to the slide and said first and second elements.

9. A mechanism as described in claim 8 further including means for selectively rotating said sleeve to cause said third element to move axially to engage or disengage with said first and second elements.

10. A mechanism as described in claim 9 wherein the means for selectively rotating said externally threaded sleeve includes a control cam, a cam follower, a rack upon which said cam follower is fixed, said cam follower engages said control cam and is moved therewith to effect movement of said rack, a pinion affixed to said externally threaded sleeve which is engaged by said rack and rotated when said rack is moved by said cam follower, and a means to controllably rotate said control cam.

11. A mechanism for positioning and securing an indexible turret against rotation with respect to a slide comprising a coupling mechanism operatively associated with the turret and the slide for locking the turret in a position to which it is rotated, said coupling mechanism comprising first and second annular coupling members carried on the slide and turret respectively and a third annular coupling member movable between a first position in which it is engaged with said first and second annular coupling members and a second position in which it is disengaged from said first and second annular coupling members, said first, second, and third annular coupling members having cooperating means for positioning the turret during movement of said third annular coupling member into engagement with said first and second annular coupling members and which lock the turret in position, and means for moving said third coupling member axially relative to said first and second annular coupling member from said engaged position to said disengaged position whereby the turret may be released for rotation without axial movement thereof.

12. A mechanism as defined in claim 11 wherein said means for moving said third annular coupling member from said engaged position to said disengaged position includes an externally threaded sleeve, said third annular coupling member being supported by said sleeve for rotational movement therein, said sleeve being supported by the slide so that rotation of said sleeve effects axial movement of said sleeve and said third annular coupling member carried thereby relative to the slide and to the turret.

13. A mechanism as defined in claim 12 further including means for selectively rotating said sleeve and wherein said externally threaded sleeve is threadably received in an internally threaded element that is rigidly secured to the slide.

14. A mechanism as defined in claim 12 further including means for effecting rotation of said third annular coupling member when said third annular coupling member is in said disengaged position, said third annular coupling member being drivingly connected to the turret so that rotation of said third annular coupling member effects rotation of the turret.

15. A mechanism as defined in claim 11 wherein said first annular coupling member is a toothed member rigidly affixed to the slide, said second annular coupling member is a toothed member rigidly affixed to turret and rotatable therewith and said third annular coupling member is a toothed member axially movable relative to the turret between said engaged and disengaged positions.

16. A mechanism as defined in claim 11 further including means for effecting rotation of the turret comprising a control cam, a plurality of cam followers affixed to said third annular coupling member engaging said control cam and effecting movement of said third annular coupling member in response to the rotation of said cam, said third annular coupling member being drivingly connected to the turret to enable the turret to rotate in response to the movement of said third annular coupling member, and a drive means to controllably rotate said control cam.

17. A mechanism as defined in claim 11 wherein said third annular coupling member exerts a clamping force on the turret when said third annular coupling member is in said engaged position so as to prevent axial movement of the turret due to forces imparted thereto during engagement of tools carried by the turret with a rotating workpiece.

18. A mechanism for positioning and securing an indexible turret against rotation with respect to a slide, said apparatus comprising a first locating and locking element connected to the slide and including a first annular array of teeth, a second locating and locking elements connected to the turret and including a second annular array of teeth, ad a third locating and locking element operatively associated with th slide and turret and including a third annular array of teeth movable between a first position in which said third annular array of teeth is disposed in meshing engagement with said first and second annular arrays of teeth and a second position in which said third annular array of teeth is spaced from said first and second annular arrays of teeth.

19. A mechanism as set forth in claim 18 wherein said third annular array of teeth includes a plurality of teeth each of which is disposed in meshing engagement with said first and second annular arrays of teeth when said third annular array of teeth is in said first position.

20. A mechanism as set forth in claim 18 wherein said mechanism further includes means for releasing the turret for rotational movement relative to the slide without moving the turret along its axis of rotation relative to the slide including means for effecting movement of said third annular array of teeth from the first position to the second position.

References Cited
UNITED STATES PATENTS

| | | | |
|---|---|---|---|
| 2,940,341 | 6/1960 | Diener | 74—824 |
| 2,979,971 | 4/1961 | Darash | 74—826 X |
| 3,513,734 | 5/1970 | Burroughs et al. | 74—826 X |

WILLIAM F. O'DEA, Primary Examiner

F. D. SHOEMAKER, Assistant Examiner

U.S. Cl. X.R.

74—813 L, 826, 827